(12) United States Patent
Iori et al.

(10) Patent No.: US 10,866,126 B2
(45) Date of Patent: Dec. 15, 2020

(54) CONNECTION UNIT FOR CONNECTING EXTERNAL DEVICE TO MEASUREMENT DEVICE

(71) Applicant: Mitutoyo Corporation, Kanagawa (JP)

(72) Inventors: Keisuke Iori, Inagi (JP); Shuji Hayashida, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/732,927

(22) Filed: Jan. 2, 2020

(65) Prior Publication Data
US 2020/0217692 A1    Jul. 9, 2020

(30) Foreign Application Priority Data
Jan. 6, 2019    (JP) .................................. 2019-000374

(51) Int. Cl.
| | | |
|---|---|---|
| *H01R 31/06* | (2006.01) | |
| *G01D 11/24* | (2006.01) | |
| *H01R 13/52* | (2006.01) | |
| *G01B 3/22* | (2006.01) | |

(52) U.S. Cl.
CPC ............... *G01D 11/24* (2013.01); *G01B 3/22* (2013.01); *H01R 13/5219* (2013.01); *G01B 2210/58* (2013.01)

(58) Field of Classification Search
CPC ...... G01B 3/22; G01B 2210/58; G01D 11/24; H01R 13/5219; H01R 31/00; H01R 31/06
USPC ................ 439/283, 119, 300, 322, 345, 347, 439/620.31, 628, 638, 639, 640, 687, 500, 439/32
See application file for complete search history.

(56) References Cited

U.S. PATENT DOCUMENTS 4,553,798 A * 11/1985 Murphy ................... H02G 3/00
 439/32
5,380,224 A * 1/1995 DiCicco ............. H01R 13/6593
 439/607.5

(Continued)

FOREIGN PATENT DOCUMENTS

| JP | 2007-305055 | 11/2007 |
|---|---|---|
| JP | 2018-67235 | 4/2008 |
| JP | 4456697 | 4/2010 |

*Primary Examiner* — Harshad C Patel
(74) *Attorney, Agent, or Firm* — Rankin, Hill & Clark LLP

(57) ABSTRACT

A connection unit for connecting an external device to a main device is provided.
A connection unit 100 includes a main body part 200 including a main connector terminal 220 to be connected to a connection port of a main device, a sub body part 300 including a sub connector terminal 320 to be connected to a connection port of an external device, and an electric cable 500 electrically connecting the main connector terminal 220 to the sub connector terminal 320. The main body part 200 and the sub body part 300 are united by engaging by an engaging means that is engageable and disengageable, and vary a relative position between the main body part 200 and the sub body part 300 by disengaging by the engaging means. The external device is electrically connected to the main device and is simultaneously attached to the main device by connecting the main device to the external device with the connection unit 100 while the main body part 200 and the sub body part 300 are united.

9 Claims, 22 Drawing Sheets

(56) References Cited

U.S. PATENT DOCUMENTS

| | | | | |
|---|---|---|---|---|
| 5,466,172 A * | 11/1995 | Carstens | ................ | H01R 31/00 |
| | | | | 439/502 |
| 5,931,690 A * | 8/1999 | Sai | ....................... | H01R 11/281 |
| | | | | 439/350 |
| 6,383,003 B1 * | 5/2002 | Corona | .............. | H01R 13/5219 |
| | | | | 439/106 |
| 6,652,288 B2 * | 11/2003 | Laukhuf | ............. | H01R 25/162 |
| | | | | 439/215 |
| 6,991,467 B1 * | 1/2006 | Cheng | .................... | H01R 31/06 |
| | | | | 439/10 |
| 7,485,007 B1 * | 2/2009 | Nee | .................... | H01R 13/6658 |
| | | | | 439/11 |
| 8,298,003 B2 * | 10/2012 | Wu | ....................... | H01R 31/005 |
| | | | | 439/501 |
| 8,517,772 B2 * | 8/2013 | Wu | ....................... | H01R 31/06 |
| | | | | 439/638 |
| 9,673,557 B1 * | 6/2017 | Barnard | ................. | H01R 13/72 |
| 2006/0258224 A1 * | 11/2006 | Liao | ....................... | H01R 25/00 |
| | | | | 439/638 |
| 2008/0227321 A1 * | 9/2008 | Reusche | ............ | H01R 13/5219 |
| | | | | 439/271 |

* cited by examiner

CONNECTION UNIT FOR CONNECTING EXTERNAL DEVICE TO MEASUREMENT DEVICE

INCORPORATION BY REFERENCE

This application is based upon and claims the benefit of priority from Japanese patent application No. 2019-000374, filed on Jan. 6, 2019, the disclosure of which are incorporated herein in its entirety by reference.

BACKGROUND OF THE INVENTION

1. Field of the Invention

The present invention relates to a connection unit for connecting an external device to a measurement device.

2. Description of Related Art

There have been used, for example, a caliper, a micrometer, and the like as small-sized measurement devices which operators hold to perform measurement. Such small-sized measurement devices have been made multifunctional, and various functions, such as a wireless communication function and the like, are added thereto.

In order to make small-sized measurement devices multifunctional, there is known a small-sized measurement device including a connection port for a connector through which an external device is to be connected the small-sized measurement device (JP 2007-305055 A, JP 4456697 B, and JP 2018-67235 A). The applicant has proposed a connection unit 10 having a flat rectangular plate shape and including connector terminals 11 and 12 to be connected respectively to a connection port 41 of a small-sized measurement device 40 and a connection port 71 of an external device 70 as exemplified in FIG. 1 (JP 2018-67235 A). In JP 2018-67235 A, the external device 70 is separated from the connector terminal 12, and the connector terminal 12 is provided to the connection unit 10. By commonly using one connection unit 10, it is possible for a user to connect various external devices (a wireless communication device, a battery, a display, and the like) to the small-sized measurement device 40.

SUMMARY OF THE INVENTION

In JP 2018-67235 A, since the designs of the connection port 71 of the external device 70 and of the connector terminal 12 of the connection unit 10 are uniformed, the connection unit 10 can be used for various external device. However, if small-sized measurement devices have different sizes, or if small-sized measurement devices are different types (a caliper, a micrometer, and a dial indicator), the distance from the connection port 41 of the small-sized measurement device 40 to the connection port 71 of the external device 70 varies. For this reason, it is required to prepare a different-sized connection unit 20 (for example, see FIG. 2). FIG. 2 is a diagram exemplifying that the external device 70 is being connected to a small-sized measurement device 50 larger (longer) than a normal size with the different-sized connection unit 20.

A purpose of the present invention is to provide a connection unit commonly used regardless of the differences in the models and sizes of main devices and external devices.

A connection unit according to an embodiment of the present invention is a connection unit (100) configured to electrically connect a main-body connection port of a main device, the main-body connection port being used to input and output a signal, to an external-device connection port of an external device, the external-device connection port being used to input and output a signal, the connection unit (100) includes:

a main body part (200) including a main connector terminal (220) to be electrically connected to the connection port of one device of the main device and the external device, and to be fixedly attached to the one device by a fixing means while the main connector terminal (220) is connected to the connection port of the one device;

a sub body part (300) including a sub connector terminal (320) to be electrically connected to the other device of the main device and the external device, and to be fixedly attached to the other device by a fixing means while the sub connector terminal (320) is connected to the connection port of the other device; and an electric cable (500) electrically connecting the main connector terminal (220) to the sub connector terminal (320), in which the main body part (200) and the sub body part (300) are united by engaging by an engaging means, the engaging means being engageable and disengageable, and vary a relative position between the main body part (200) and the sub body part (300) by disengaging by the engaging means, and the external device is electrically connected to the main device and is simultaneously attached to the main device by attaching the main body part (200) to the one device and attaching the sub body part (300) to the other device while the main body part (200) and the sub body part (300) are united.

In an embodiment of the present invention, it is preferable that the engaging means includes:
an engaging step portion (260 or 270) having a substantially-serrate section and provided to one of the main body part (200) and the sub body part (300); and
an engaging claw portion (360) provided to the other one of the main body part (200) and the sub body part (300), and engaging with the engaging step portion (260 or 270) so as to be engageable and disengageable.

In an embodiment of the present invention, it is preferable that the engaging means is engageable at a plurality of positions at which relative positions between the main body part (200) and the sub body part (300) are different.

In an embodiment of the present invention, it is preferable that the main body part (200) includes a bottomed-cylindrical main housing part (210) having an opening (212) on at least one surface, and the sub body part (300) includes a sub housing part (310) to be received inside the main housing part (210) from the opening (212) of the main housing part (210).

In an embodiment of the present invention, it is preferable that the connection unit (100) further includes an electronic substrate (250) disposed deep inside the main housing part (210), in which a waterproof wall (280) liquid-tightly partitioning a space between the opening (212) and the electronic substrate (250) is provided closer to the opening (212) than the electronic substrate (250).

In an embodiment of the present invention, it is preferable that the connection unit (100) further includes an biasing means (410) provided between the sub housing part (310) and the main housing part (210) and for generating an biasing force in a direction in which the sub housing part (310) moves toward the main housing part (210).

In an embodiment of the present invention, it is preferable that the biasing means (410) is an elastic body having one end fixed inside the main housing part (210) and the other end fixed to the sub housing part (310).

In an embodiment of the present invention, it is preferable that the main connector terminal (220) is provided so as to protrude from the main housing part (210) in a direction orthogonal to the direction of the biasing force, and the sub housing part (310) includes an auxiliary supporting member (420) protruding in a direction parallel to the main connector terminal (220) and to be pressed against a sidewall of the main device when the sub housing part (310) is partially pulled out of the inside of the main housing part (210).

In an embodiment of the present invention, it is preferable that the connection unit (100) further includes a stretching covering member (390) having a cylindrical and bellows shape, in which the covering member (390) has one opening attached to the opening (212) of the main housing part (210) so as to surround the opening (212), and the other opening attached to an outer side face (316) of the sub housing part (310) to waterproof the inside of the main housing part (210).

DETAILED DESCRIPTION

Figure 1:
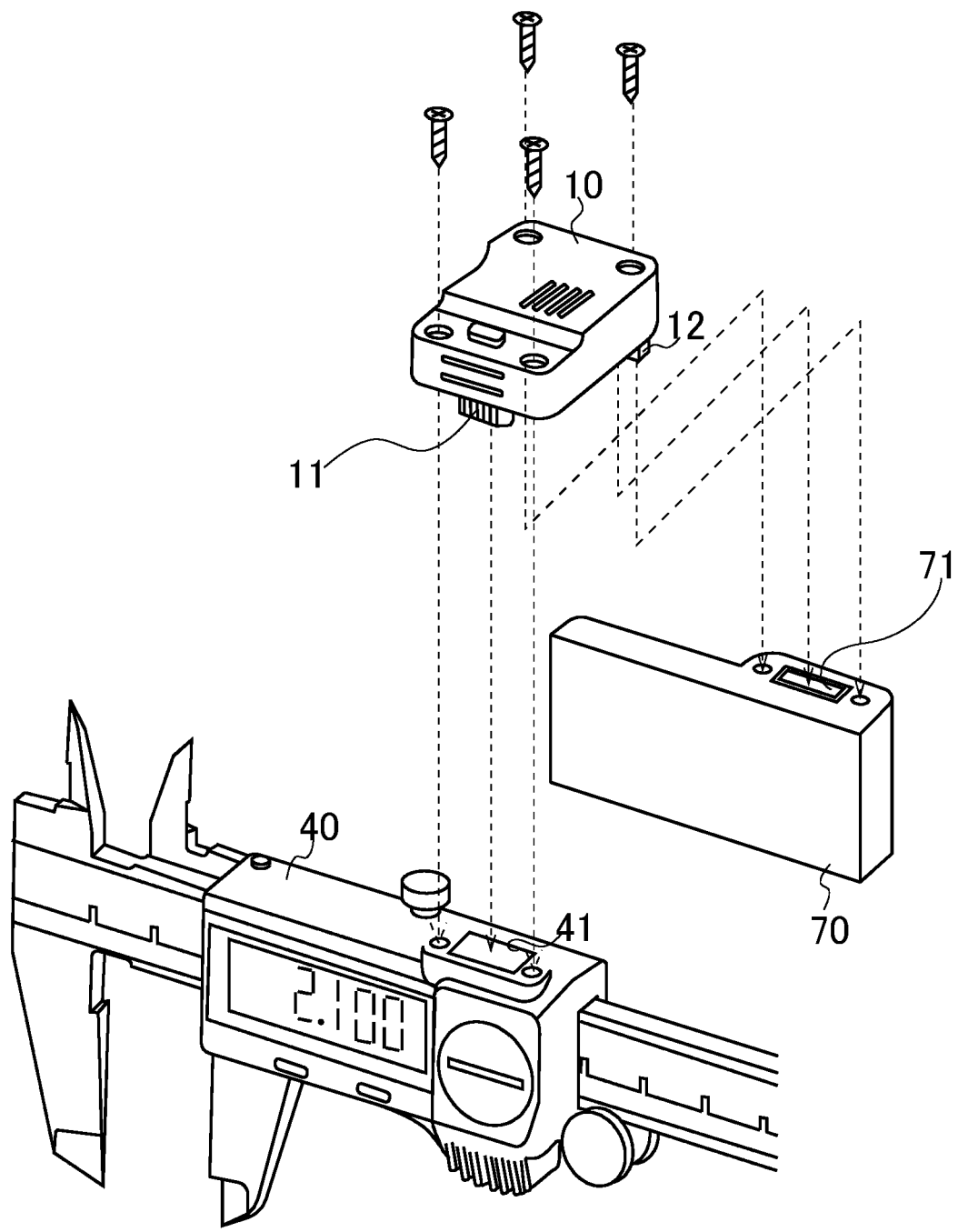
FIG. 1 is a diagram exemplifying a connection unit as a related art.
Figure 2:
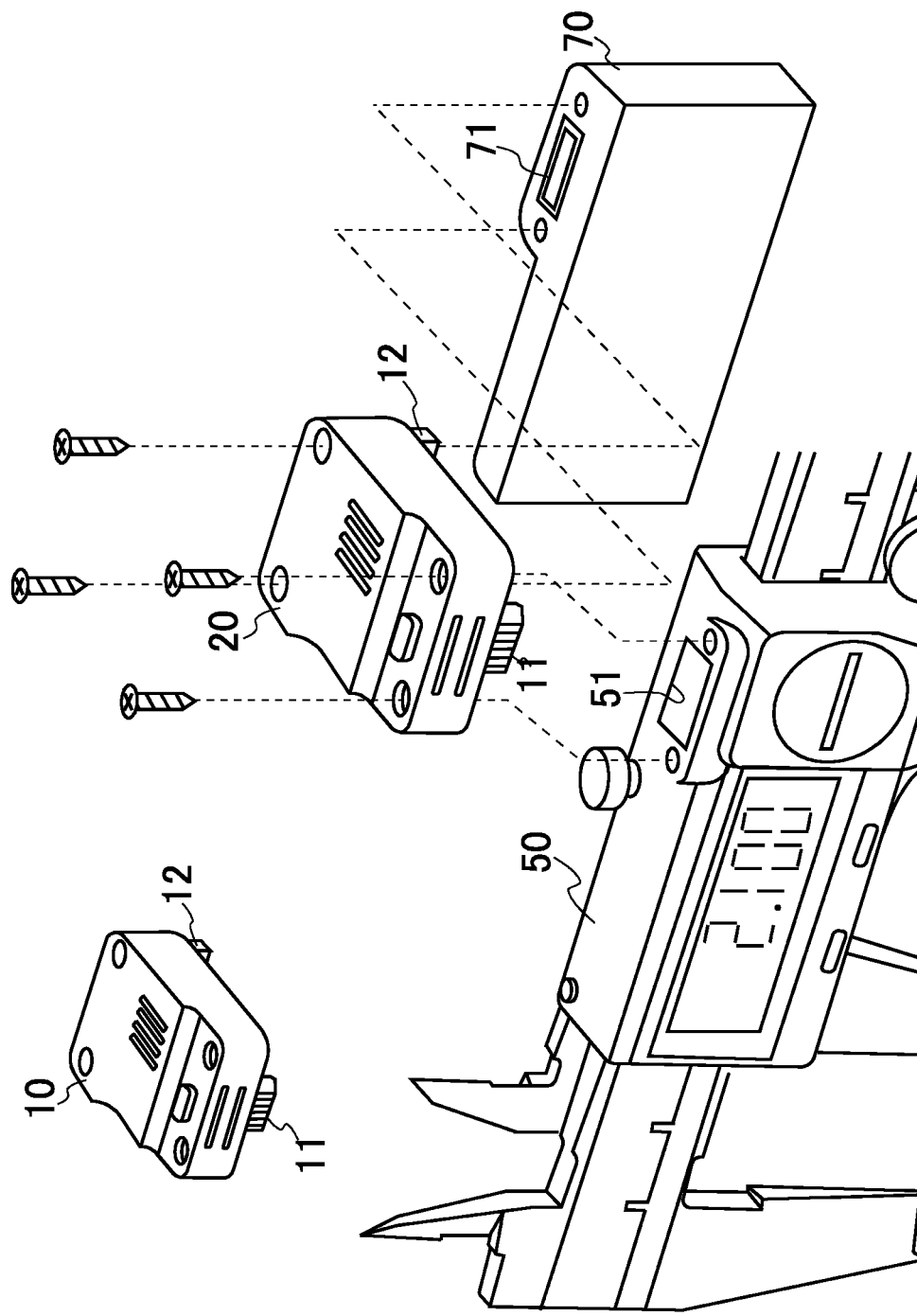
FIG. 2 is a diagram exemplifying a connection unit as a related art.

Embodiments of the present invention are illustrated and described with reference to the reference signs attached to the elements in the drawings.

First Exemplary Embodiment

A connection unit 100A according to a first exemplary embodiment of the present invention is described below.

Figure 3:
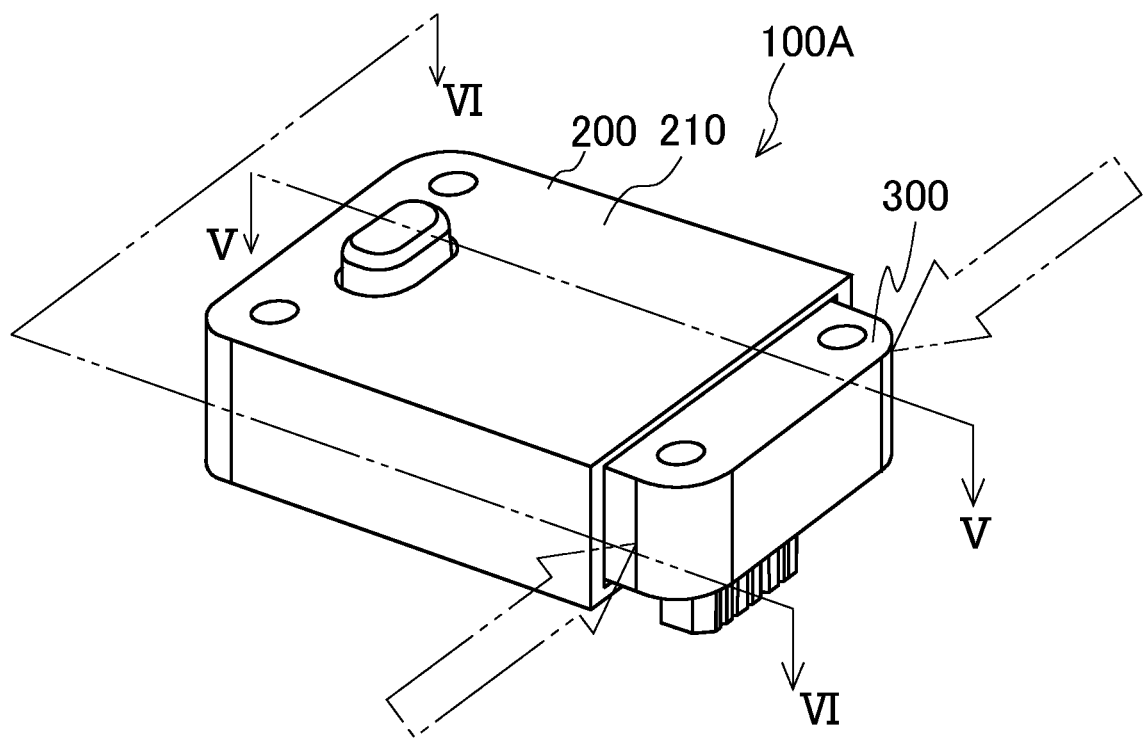
FIG. 3 is a perspective view of an external appearance of a connection unit in which a main body part and a sub body part are united.

FIG. 3 is a perspective view of an external appearance of the connection unit 100A in which a main body part 200 and a sub body part 300 are united.

Figure 4:
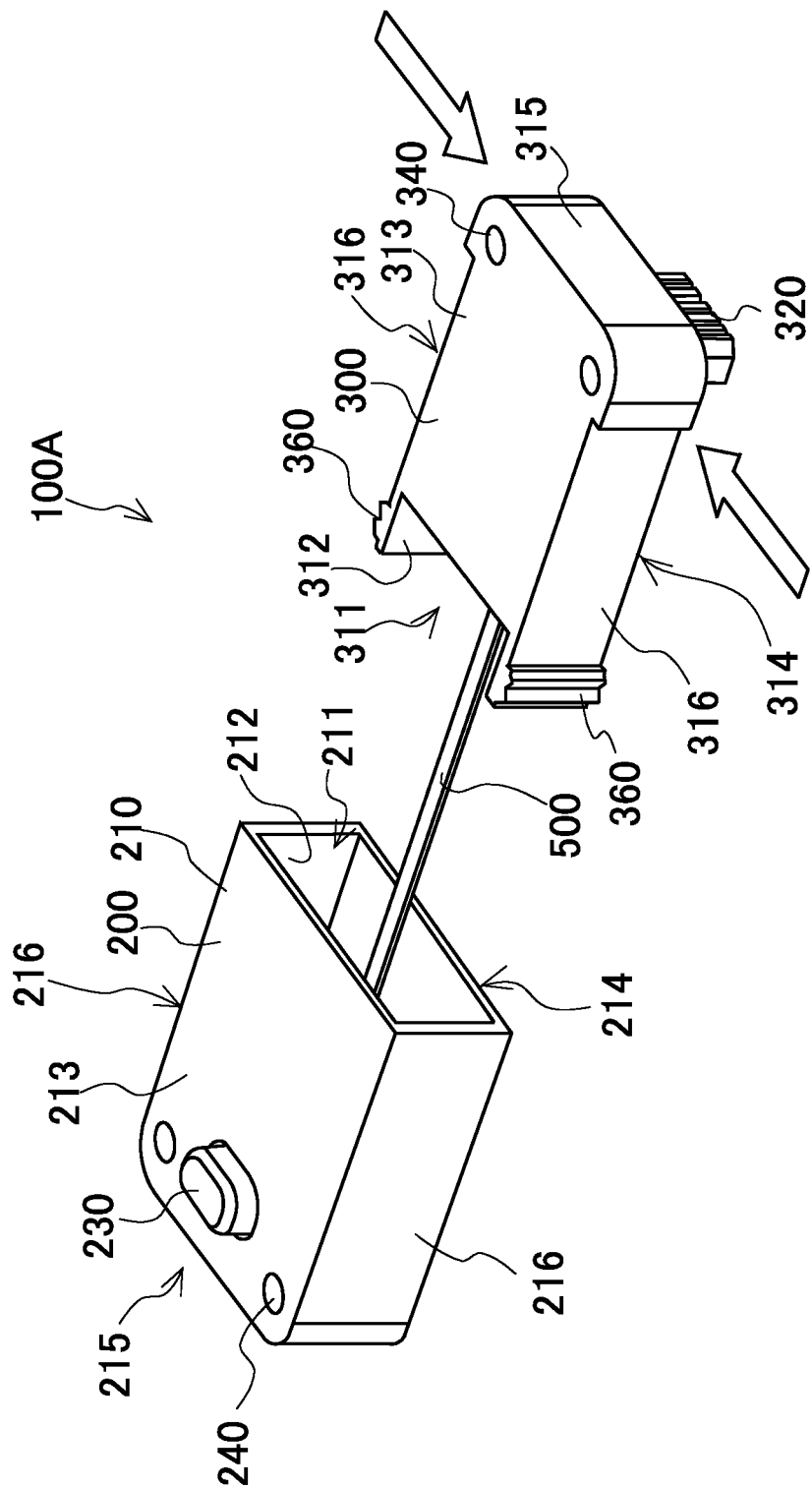
FIG. 4 is a perspective view of an external appearance of the connection unit in which the main body part and the sub body part are separated.

FIG. 4 is a perspective view of an external appearance of the connection unit 100A in which the main body part 200 and the sub body part 300 are separated.

Figure 5:
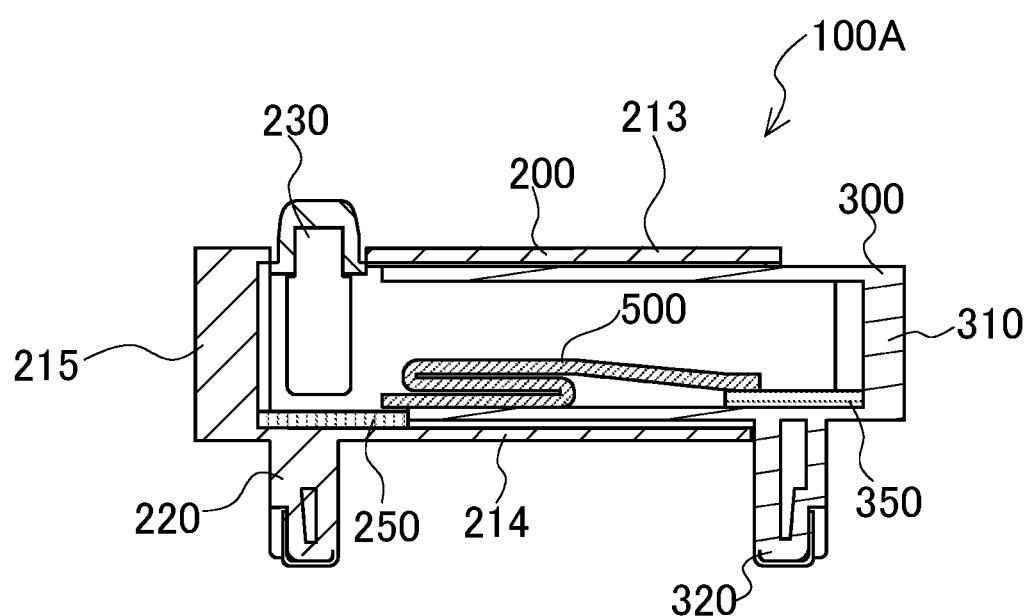
FIG. 5 is a sectional view taken along the line V-V in FIG. 3.
Figure 6:
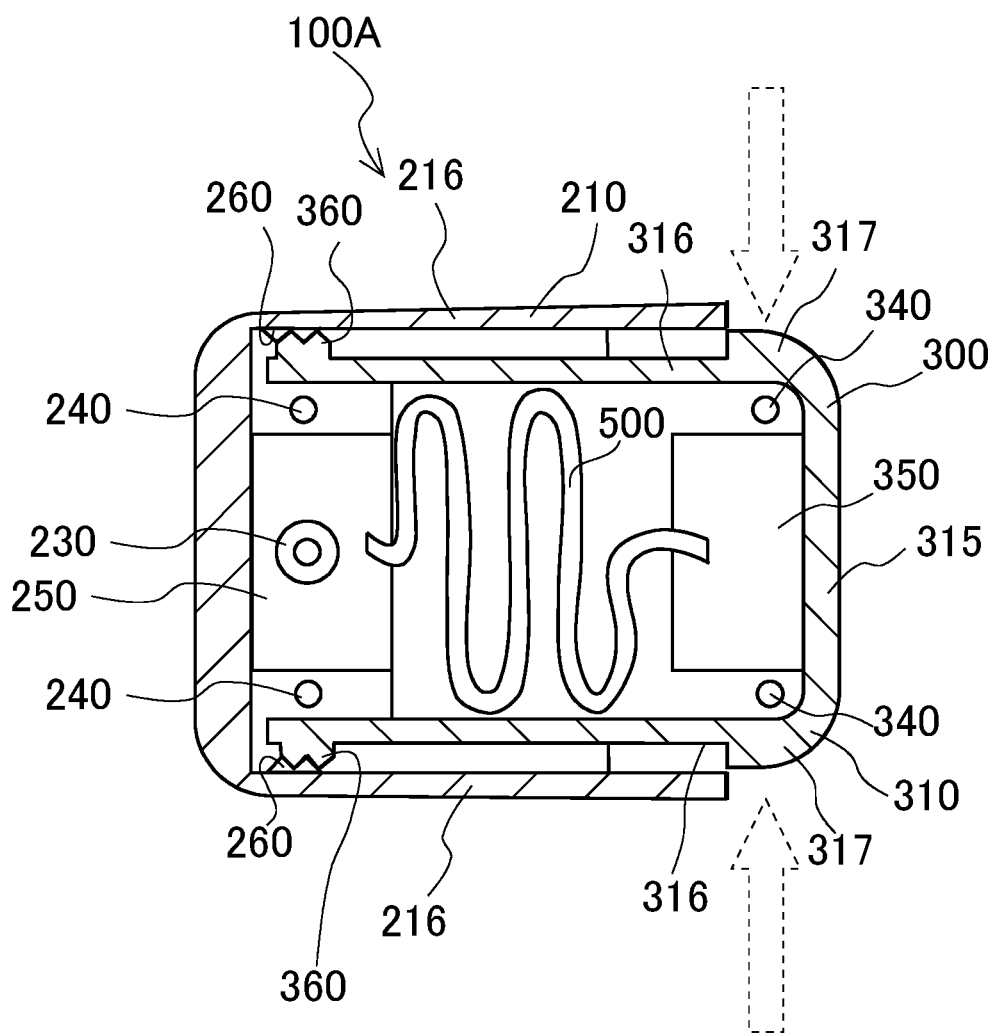
FIG. 6 is a sectional view taken along the line VI-VI in FIG. 3.

FIGS. 5 and 6 are sectional views of the connection unit 100A in the united state.

FIG. 5 is a sectional view taken along the line V-V in FIG. 3, and FIG. 6 is a sectional view taken along the line VI-VI in FIG. 3.

Figure 7:
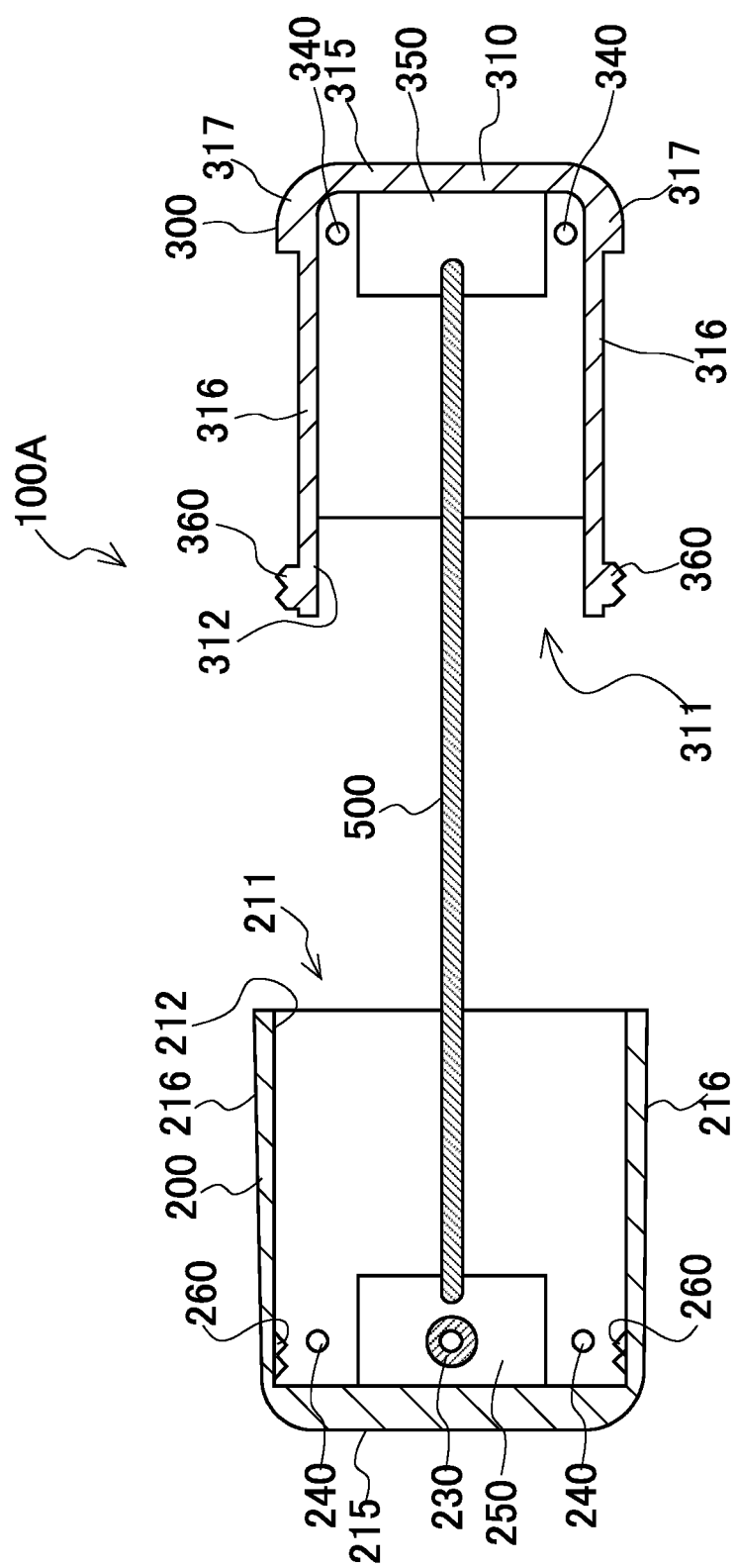
FIG. 7 is a sectional view of the connection unit in a separated state.

FIG. 7 is a sectional view of the connection unit 100A in the separated state.

The connection unit 100A includes a main body part 200, a sub body part 300, and an electric cable 500.

The main body part 200 includes a main housing part 210.

The main housing part 210 has a flat rectangular parallelepiped shape in appearance, and has a bottomed cylindrical shape having an opening 212 on one surface.

For the sake of explanation, in the posture shown in FIG. 3 or 4, a surface positioned at the top of the main housing part 210 is referred to as a top face 213, a surface positioned at the bottom is referred to as a bottom face 214. A surface on which the opening 212 is provided is referred to as a front face 211, and a surface facing the front face 211 is referred to as a rear face 215. Lastly, two surfaces orthogonal to the top face 213, the bottom face 214, the front face 211, and the rear face 215 are referred to as side faces 216.

On the bottom face 214 of the main housing part 210, a main connector terminal 220 is provided close to the rear face 215 so as to protrude (for example, see FIG. 5). In addition, on the top face 213 of the main housing part 210, a push button 230 is provided close to the rear face 215. Two holes 240 are provided so as to pass through from the top face 213 to the bottom face 214, and the button 230 and the main connector terminal 220 are disposed between the two holes 240. The two holes 240 are used to insert set screws as a fixing means.

Inside the main housing part 210, an electronic substrate 250 is disposed close to the rear face 215. The electronic substrate 250 is conductively connected to the main connector terminal 220, and is capable of detecting a pressing operation of the button 230. The function of the button 230 varies depending on an external device. For example, if an external device is a wireless communication device, the button 230 functions as a transmission-reception switch.

Inside the main housing part 210, the two side faces 216 each includes an engaging step portion 260 (for example, see FIGS. 6 and 7). The engaging step portion 260 has a shape having two triangular ridges arranged side by side as shown in the sectional view in FIG. 6 or 7.

Next, a configuration of the sub body part 300 is described.

The sub body part 300 includes a sub housing part 310.

The sub housing part 310 has a flat rectangular parallelepiped shape in appearance, and has a bottomed cylindrical shape having an opening 312 on one surface. For the sake of explanation, in the posture shown in FIG. 3 or 4, a surface positioned at the top of the sub housing part 310 is referred to as a top face 313, a surface positioned at the bottom is referred to as a bottom face 314. A surface on which the opening 312 is provided is referred to as a front face 311, and a surface facing the front face 311 is referred to as a rear face 315. Lastly, two surfaces orthogonal to the top face 313, the bottom face 314, the front face 311, and the rear face 315 are referred to as side faces 316.

The sub body part 300 is inserted in and removed from the main housing part 210 from the opening 212 of the main housing part 210. At this time, by inserting the front face 311 of the sub housing part 310 first so that the front face 211 (the opening 212) of the main housing part 210 faces the front face 311 (the opening 312) of the sub housing part 310, the sub body part 300 is inserted in the opening 212 of the main housing part 210.

On the bottom face 314 of the sub housing part 310, a sub connector terminal 320 is provided close to the rear face 315 so as to protrude. Two holes 340 are provided so as to pass through from the top face 313 to the bottom face 314, and the sub connector terminal 320 is disposed between the two holes 340. The two holes 340 are used to insert set screws as a fixing means.

Inside the sub housing part 310, an electronic substrate 350 is disposed close to the rear face 315. The electronic substrate 350 is conductively connected to the sub connector terminal 320.

On each side face 316 of the sub housing part 310, an engaging claw portion 360 is provided close to the front face 311. Specifically, each side face 316 of the sub housing part 310 slightly protrudes from the front face 311, and the engaging claw portion 360 is provided on outer side face 316 at the end the protrusion. The engaging claw portion 360 has, as shown in the sectional view in FIG. 6 or FIG. 7, an irregularity shape for engaging with the engaging step portion 260 of the main housing part 210, and has a shape having two triangular ridges arranged side by side. As shown in FIG. 6, when the sub housing part 310 is inserted inside the main housing part 210, the engaging claw portion 360 engages with the engaging step portion 260, and the main body part 200 and the sub body part 300 are thereby united.

The distance between the main connector terminal 220 and the sub connector terminal 320 in the united state is designed to correspond the distance between the connection ports 41 and 71 when an external device 70 is attached to a small-sized measurement device 40. It is preferable that the main body part 200 and the sub body part 300 do not rattle in the united state. Thus, it is preferable that the inner dimension of the main housing part 210 in the height direction is designed to be substantially the same as the outer dimension of the sub housing part 310 in the height direction.

On each side face 316 of the sub housing part 310, a protruding side portion 317 is provided close to the rear face 315 so as to slightly protrude sideways. As shown by arrows in FIGS. 3, 4, and 6, the sub housing part 310 is slightly deformed by pushing both protruding side portions 317 with fingers, and the engaging claw portion 360 disengages from the engaging step portion 260. Then, by pulling the sub body part 300 while holding the protruding side portions 317 with the fingers, and the sub body part 300 is pulled out of the main housing part 210. In this manner, the engaging claw portion 360 and the engaging step portion 260 constitute an engaging means that is engageable and disengageable.

The electric cable 500 has a predetermined length, and electrically connects the electronic substrate 250 of the main body part 200 to the electronic substrate 350 of the sub body part 300.

When the main body part 200 and the sub body part 300 are united, the electric cable 500 is folded and housed inside the main housing part 210 and the sub housing part 310 while being bent in a meander shape. When the main body part 200 and the sub body part 300 are separated, the electric cable 500 is pulled out of the inside of the main housing part 210 and the sub housing part 310, and connects the main body part 200 to the sub body part 300.

Now, the usage of the connection unit 100A according to the first exemplary embodiment is described.

The connection unit 100A according to the present exemplary embodiment is assumed to be used mainly in the united state.

Figure 8:
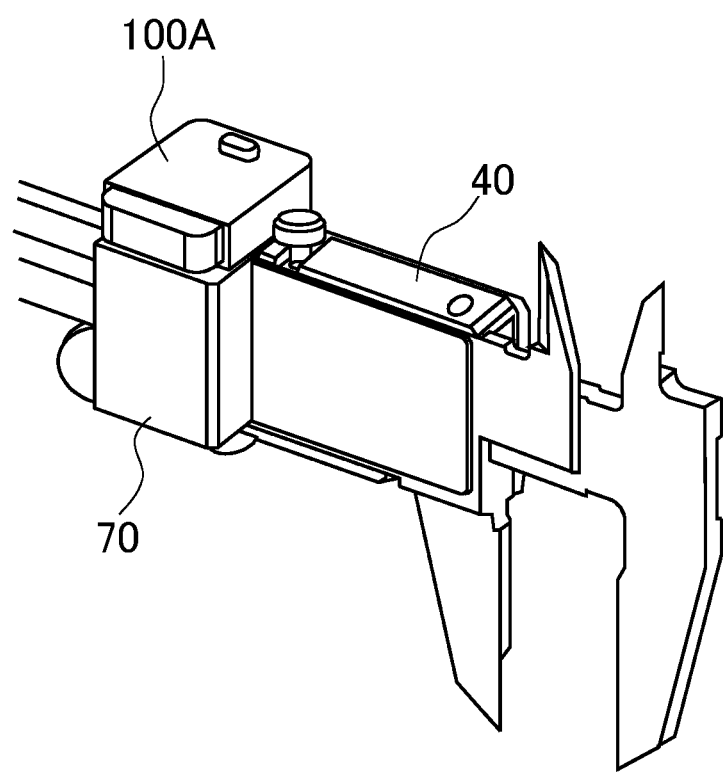
FIG. 8 is a diagram showing, as an example, that an external device is attached to a main device (small-sized measurement device) with a connection unit 100A.
Figure 9:
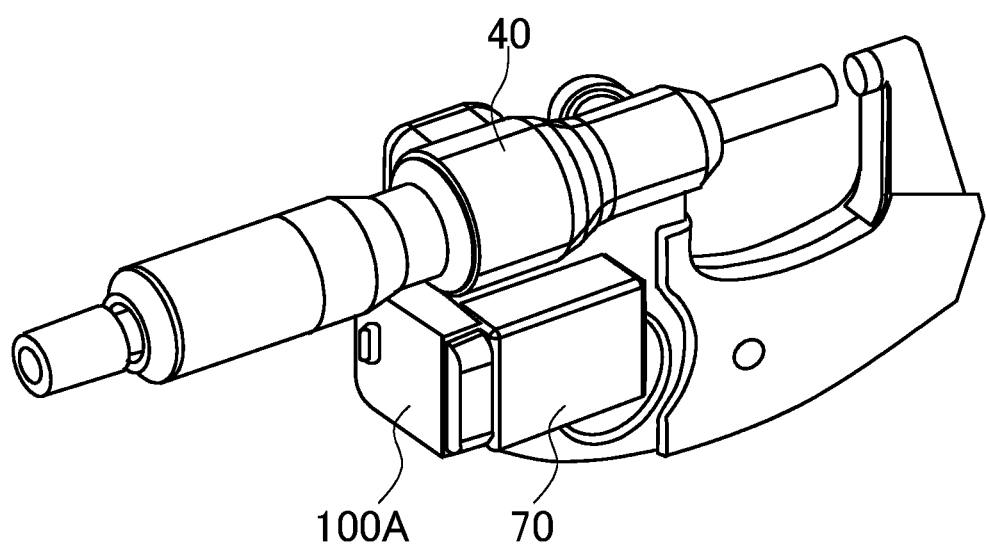
FIG. 9 is a diagram showing, as an example, that an external device is attached to a main device (small-sized measurement device) with the connection unit 100A.

As exemplified in FIG. 8 or 9, the connection unit 100A in the united state is used to attach the external device (for example, a wireless communication device) 70 to the small-sized measurement device (a caliper or a micrometer) 40 that is used by being held as a main device.

First, the main connector terminal 220 is inserted into the connection port 41 of the small-sized measurement device 40, and the main body part 200 is attached and fixed to the small-sized measurement device 40 with ser screws.

Then, the sub connector terminal 320 is inserted into the connection port 71 of the external device 70, and the sub body part 300 is attached and fixed to the external device 70 with set screws. The external device 70 is thereby attached to the small-sized measurement device 40, and both are electrically connected.

The connection unit 100A in the united state is one object that is not deformed, and the external device 70 is fixedly attached to the small-sized measurement device (main device) 40 by the connection unit 100A in the united state. The external device 70 may be closely attached to the small-sized measurement device 40, or the external device 70 and the small-sized measurement device 40 have a slight gap therebetween. Since the external device 70 and the small-sized measurement device 40 are firmly fixedly connected, the external device 70 does not obstruct measurement when the small-sized measurement device 40 is held to perform the measurement, and the operability of the small-sized measurement device 40 is maintained.

As a next example, it is assumed that a user desires to connect the external device 70 to a main device (a caliper or a micrometer) larger (longer) than a normal size to perform measurement. At this time, if the external device 70 is closely attached to a long small-sized measurement device 50, the distance between a connection port 51 of the long small-sized measurement device 50 and the connection port 71 of the external device 70 is larger than the distance between the connector terminals of the connection unit 100A. Thus, the connection unit 100A in the united state cannot connect the main device to the external device.

Figure 10:
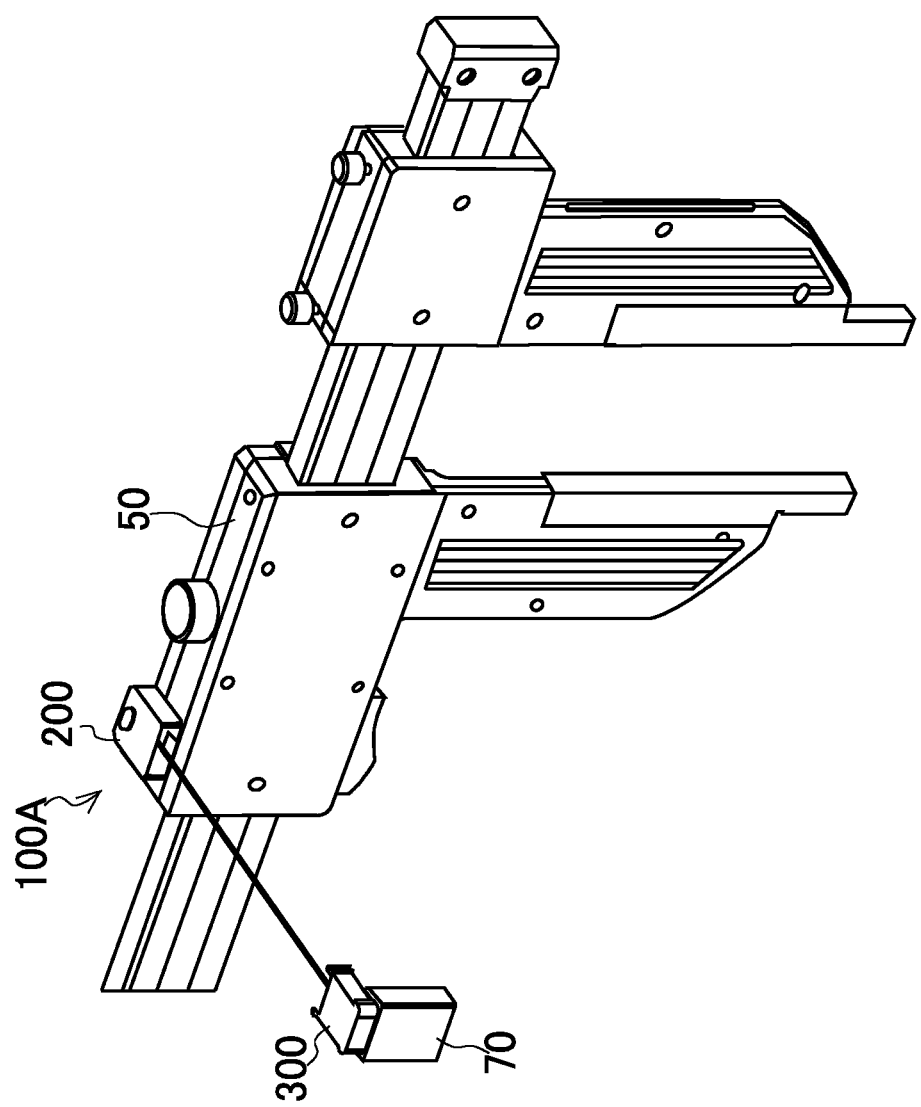
FIG. 10 is a diagram showing, as an example, that an external device 70 is connected to a long small-sized measurement device 50 while a main body part 200 and a sub body part 300 are separated.
Figure 11:
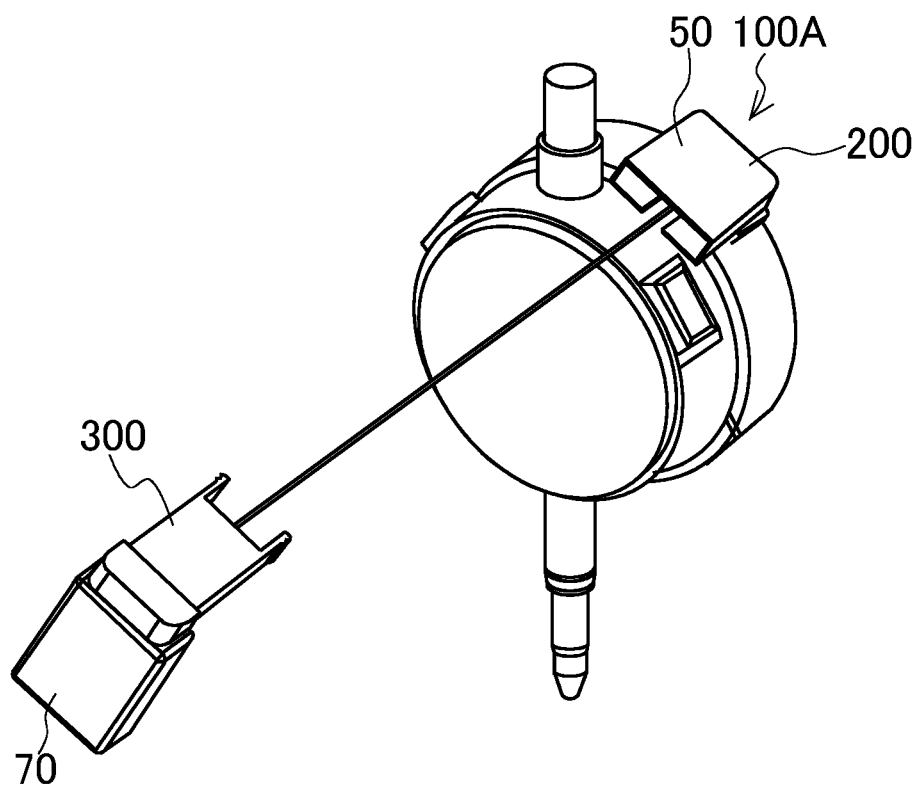
FIG. 11 is a diagram showing, as an example, that the external device 70 is connected to the long small-sized measurement device 50 while the main body part 200 and the sub body part 300 are separated.

For this reason, as exemplified in FIG. 10, while the main body part 200 and the sub body part 300 are separated, the main body part 200 is attached to the long small-sized measurement device 50, and the sub body part 300 is attached to the external device 70.

In this state, the main body part 200 and the sub body part 300 are electrically connected by the electric cable 500.

When the long small-sized measurement device 50 is actually used to perform measurement, the long small-sized measurement device 50 is used by being attached to, for example, a stand more often than by being held. Thus, at the same time when the long small-sized measurement device 50 is attached to a stand, the external device 70 is also held by the stand. This prevent the electric cable 500 and the unfixed external device 70 from obstructing measurement.

In this manner, by changing the connection unit 100A to be in the united or the separated state, it is possible to commonly use the connection unit 100A regardless of the type, such as a handy type or a long type, of the main device.

Second Exemplary Embodiment

A connection unit 100B according to a second exemplary embodiment is configured by adding a waterproof mechanism to the connection unit 100A according to the first exemplary embodiment.

Figure 12:
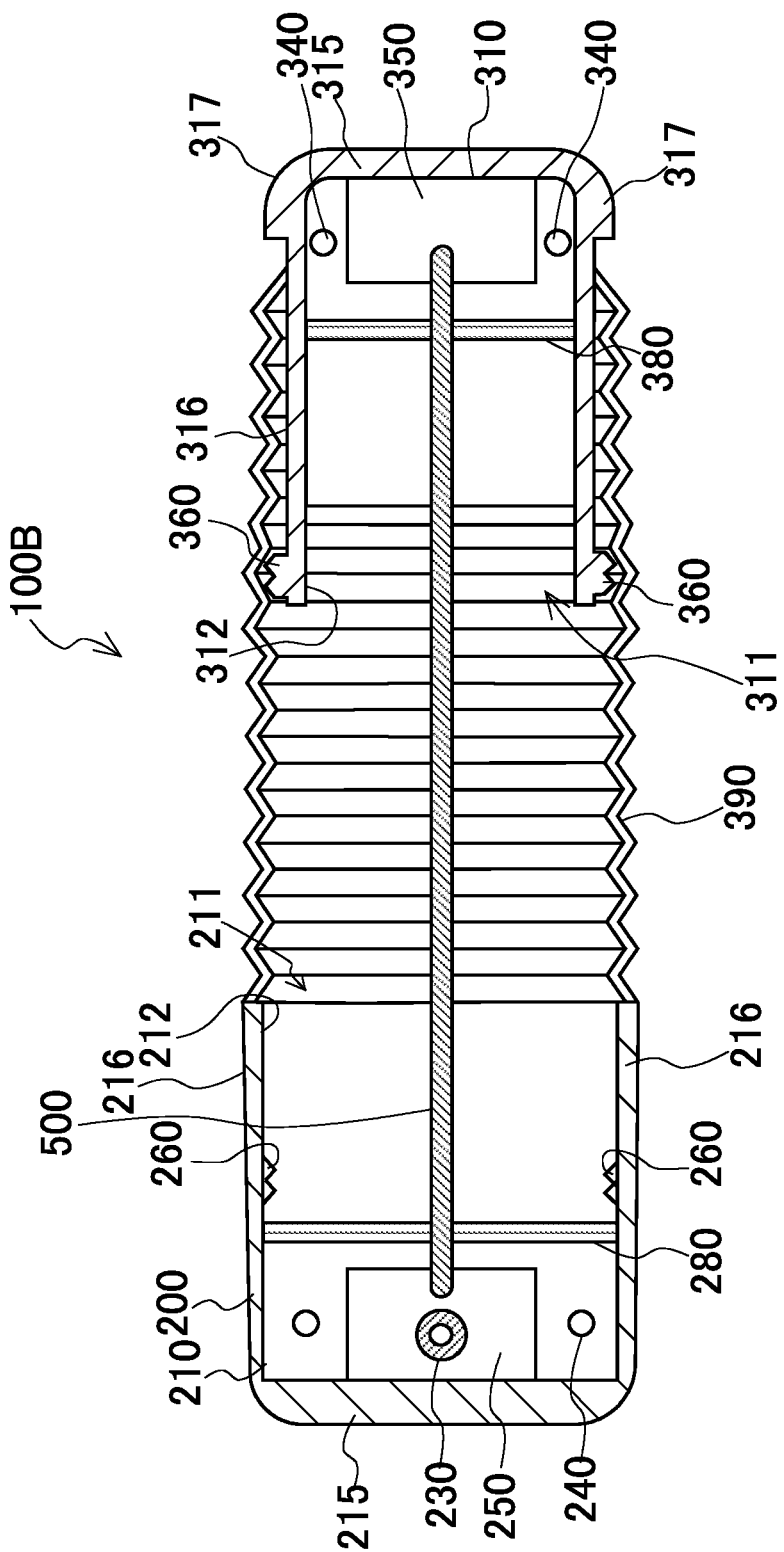
FIG. 12 is a diagram exemplifying a second exemplary embodiment.

FIG. 12 exemplifies the second exemplary embodiment.

First, since the electronic substrate 250 is disposed deep inside the main housing part 210 (close to the rear face 215), a waterproof wall 280 that liquid-tightly partitions the space between the opening 212 and the electronic substrate 250 is provided slightly closer to the front face 211 than the electronic substrate 250. Naturally, the waterproof wall 280 is provided with a hole for inserting the electric cable 500 therein, and the hole is waterproofed while the electric cable 500 is inserted. (For example, a gap is covered with an adhesive or a seal.) Similarly, since the electronic substrate 350 is disposed deep inside the sub housing part 310 (close to the rear face 315), a waterproof wall 380 that liquid-tightly partitions the space between the opening 312 and the electronic substrate 350 is provided slightly closer to the front face 311 than the electronic substrate 350. In this state, electronic components (250 and 350) are waterproofed, but it is preferable that the main body part 200 is further connected to the sub body part 300 with a covering member 390. For example, the covering member 390 has a cylindrical and bellows shape and stretches, one end of the covering member 390 is attached to the opening 212 of the main housing part 210 so as to surround the opening 212. The other end of the covering member 390 is attached to the outer side face of the sub housing part 310. With the above, the inside of the main housing part 210 and the sub housing part 310 is waterproofed. The covering member 390 can protect the electric cable 500 in addition to waterproofing it.

Third Exemplary Embodiment

Next, a connection unit 100C according to a third exemplary embodiment is described.

Figure 13:
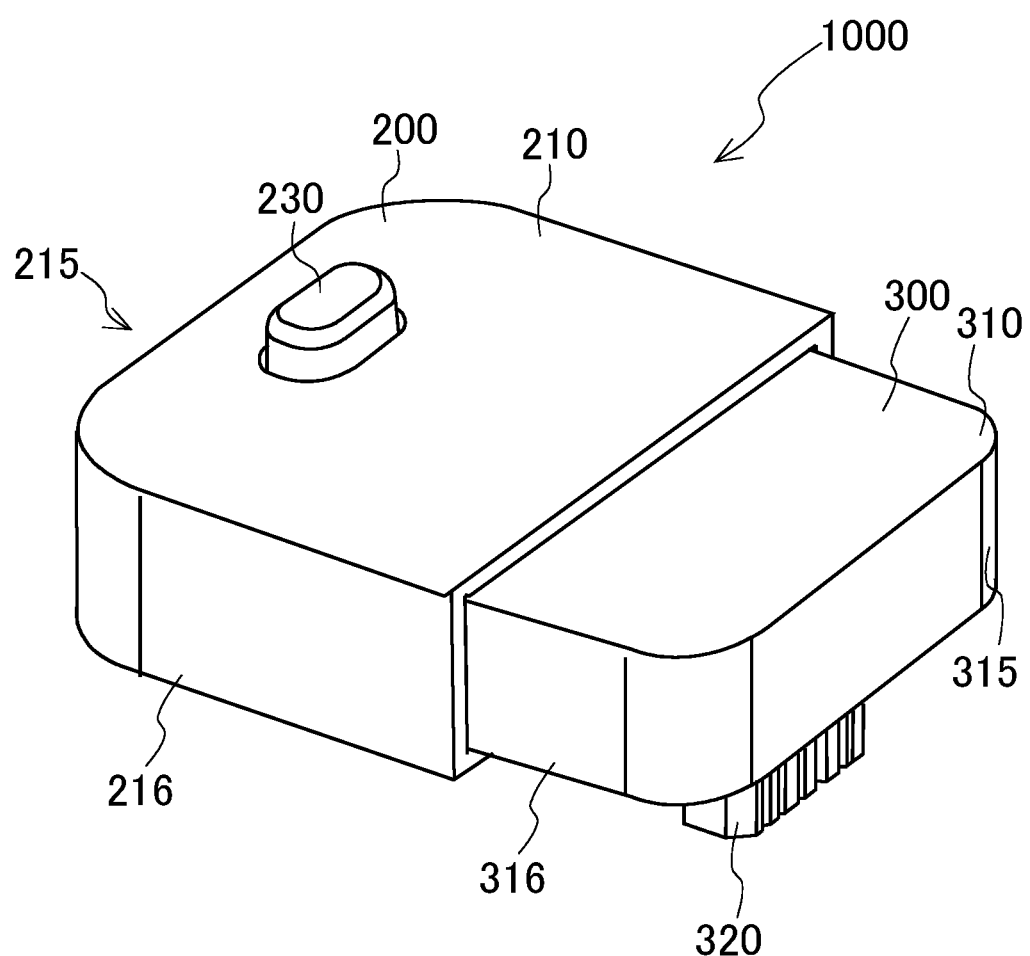
FIG. 13 is a perspective view of an external appearance in a third exemplary embodiment.
Figure 14:
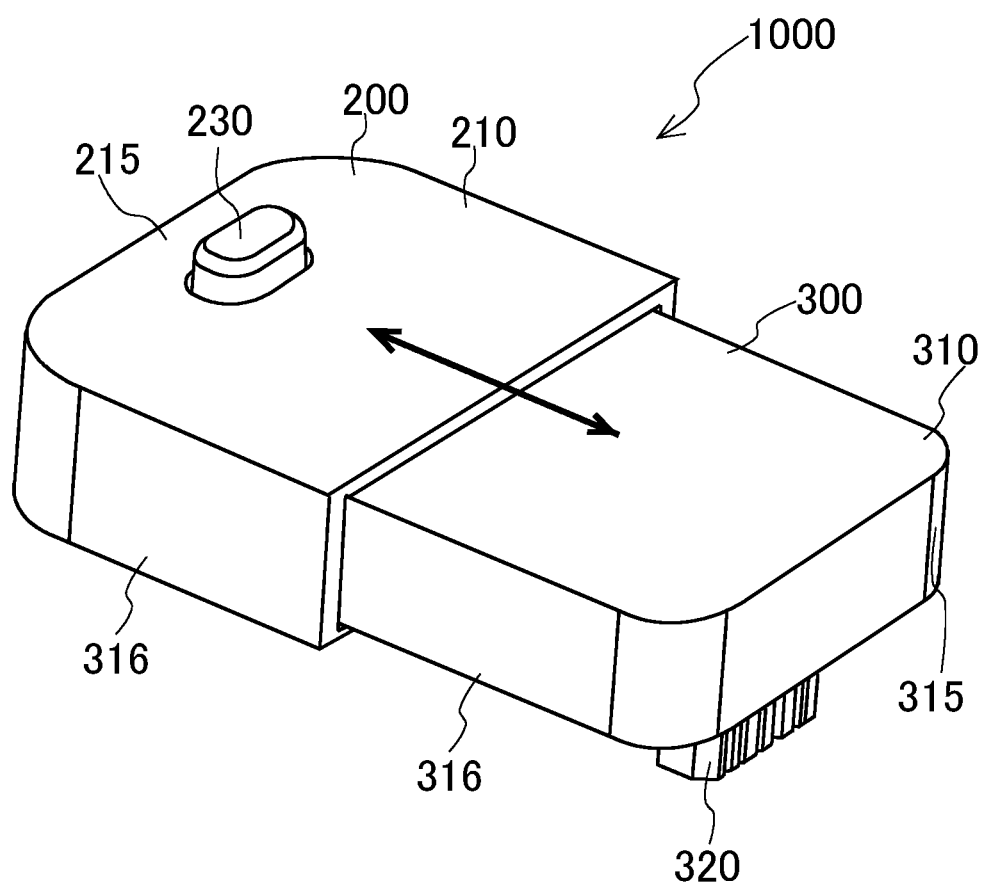
FIG. 14 is a perspective view of an external appearance in the third exemplary embodiment.

FIGS. 13 and 14 shows perspective views of an external appearance of the connection unit 100C according to the third exemplary embodiment.

In the connection unit 100C according to the third exemplary embodiment, the main body part 200 and the sub body part 300 are fixed at a plurality of positions at which relative positions between the main body part 200 and the sub body part 300 are different, in contrast to the connection unit 100A according to the first exemplary embodiment. That is, in the connection unit 100C, the main body part 200 and the sub body part 300 are united while the sub body part 300 is pushed deep inside the main body part 200 as shown in FIG. 13. In addition, the main body part 200 and the sub body part 300 are united while the main connector terminal 220 is separated away from the sub connector terminal 320 by pulling out the sub body part 300 from the main body part 200 as shown FIG. 14.

Inside the main housing part 210, the two side faces 216 each are provided with an engaging step portion 270.

Figure 15:
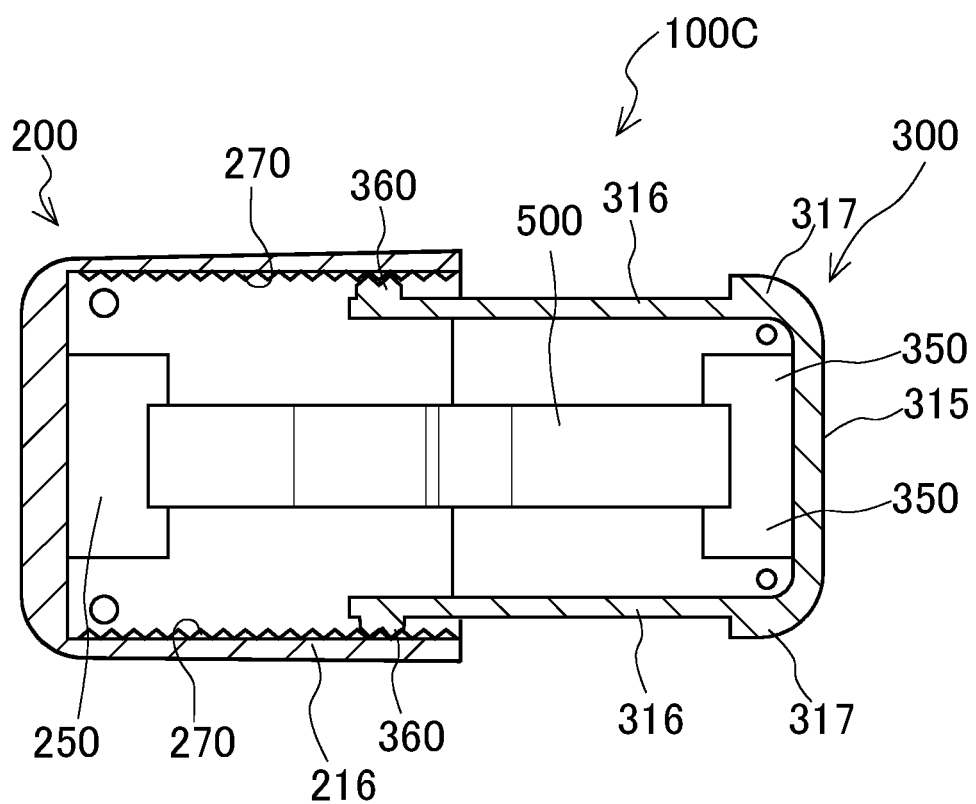
FIG. 15 is a sectional view in the third exemplary embodiment.
Figure 16:
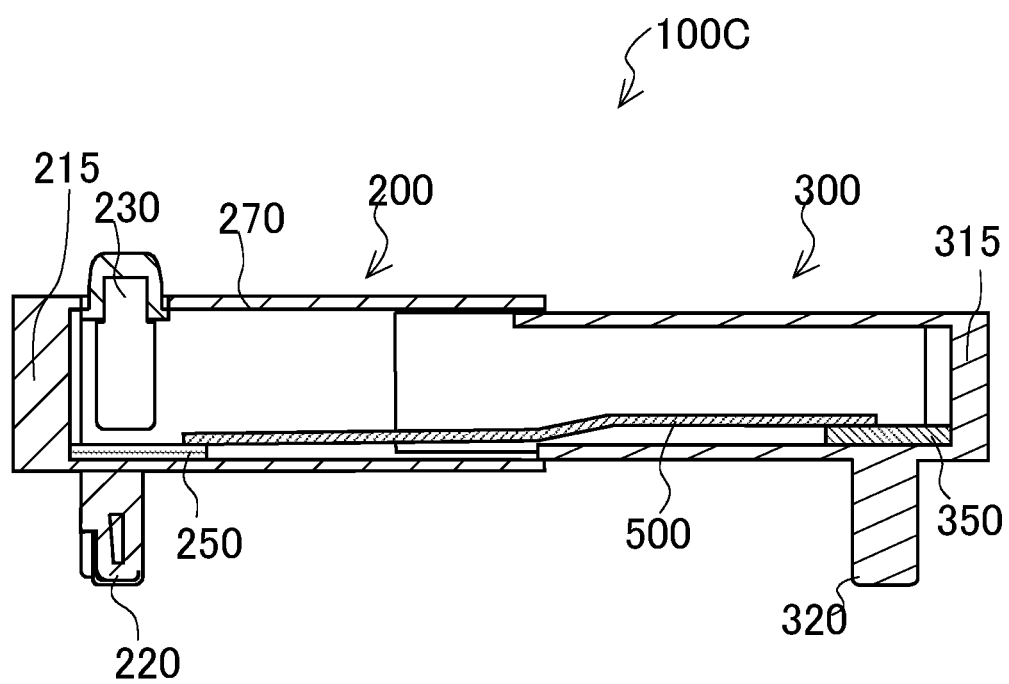
FIG. 16 is a sectional view in the third exemplary embodiment.

In the third exemplary embodiment, as shown in FIGS. 15 and 16, the long engaging step portion 270 having a substantially-serrate section is provided from the opening 212 to the deep inside (to the rear face). On each side face 316 of the sub housing part 310, the engaging claw portion 360 is provided, and the engaging claw portion 360 can engage with the long engaging step portion 270 at any position.

Thus, it is possible to arbitrarily adjust the length for which the sub body part 300 is pulled out from the main body part 200.

Figure 17:
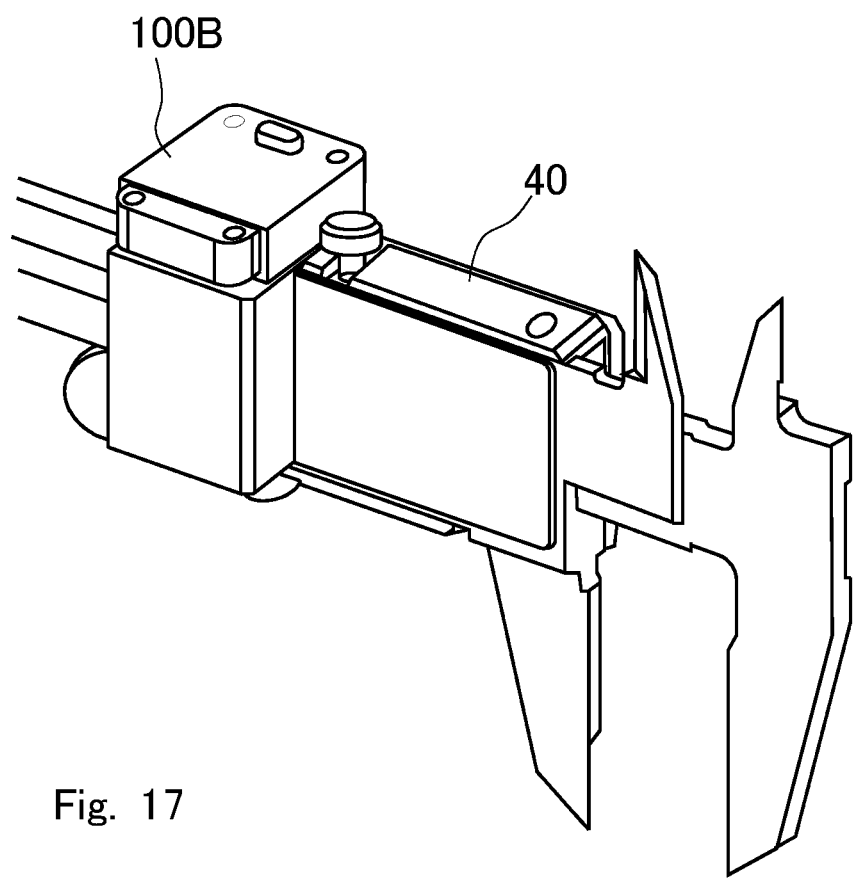
FIG. 17 is a diagram showing, as an example, that an external device is attached to a main device (small-sized measurement device) with a connection unit.

As shown in FIG. 17, when a user desires to connect the external device 70 to a small-sized measurement device 40 that is used by being held, the main body part 200 and the sub body part 300 are united while the sub body part 300 is pushed deep inside the main body part 200.

Figure 18:
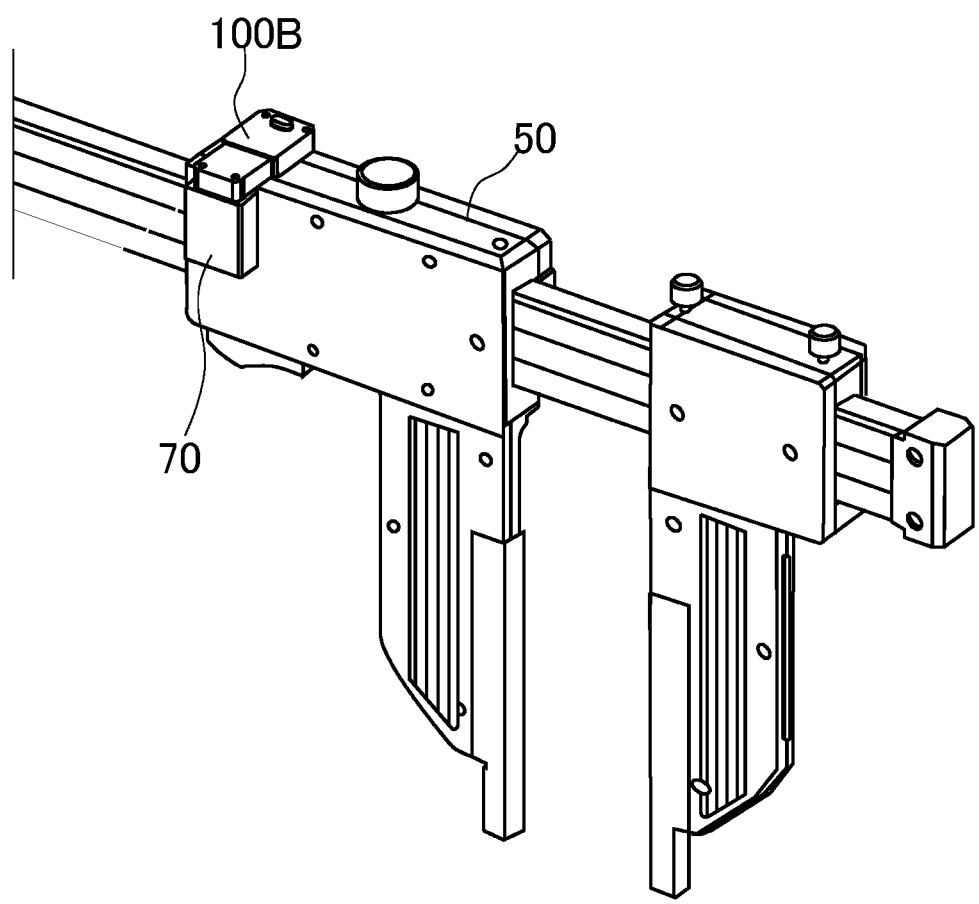
FIG. 18 is a diagram showing, as an example, that an external device is attached to a main device (small-sized measurement device) with the connection unit.

As shown in FIG. 18, when a user desires to connect the external device 70 to a main device 50 larger (longer) than a normal size, the sub body part 300 and the main body part 200 are united while the sub body part 300 is slightly pulled out from the main body part 200.

In this state, the main body part 200 is attached to the long small-sized measurement device 50, and the sub body part 300 is attached to the external device 70. Then, the external device 70 is electrically and fixedly connected to the long small-sized measurement device 50. Although various small-sized measurement devices that are used by being held have different sizes, it is possible to commonly use the connection unit 100C according to the third exemplary embodiment regardless of the size of a main device (measurement device).

Figure 19:
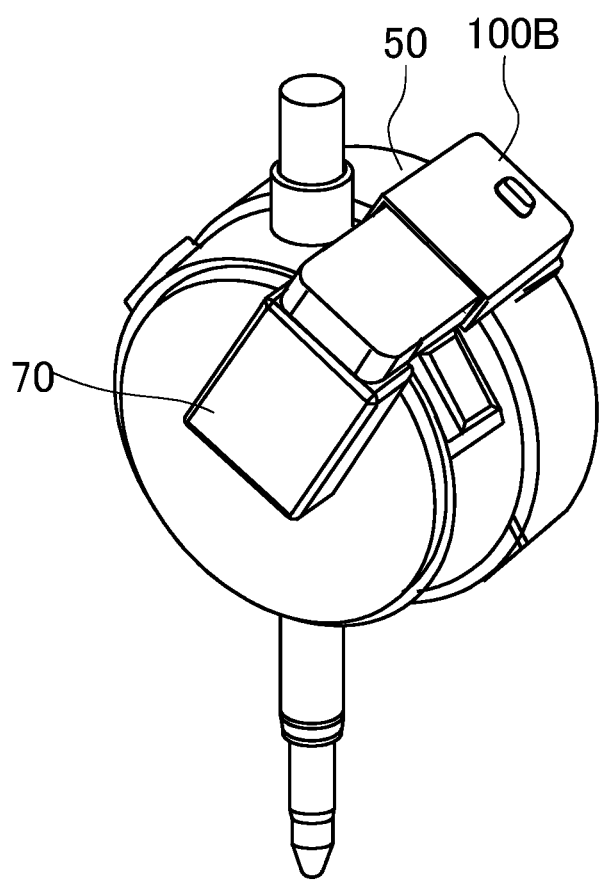
FIG. 19 is a diagram showing, as an example, that an external device is attached to a main device (small-sized measurement device) with the connection unit.

In addition, if the long small-sized measurement device 50 is attached to a stand to perform measurement, the external device 70 does not need to be separately fixed to the stand at this time. FIG. 19 is a diagram showing that the external device 70 is attached to a main device (dial indicator) with the connection unit 100C according to the third exemplary embodiment.

Fourth Exemplary Embodiment

Next, a connection unit 100D according to a fourth exemplary embodiment is described.

The connection unit 100D according to the fourth exemplary embodiment is configured by adding a structural reinforcing means to the connection unit 100D according to the third exemplary embodiment.

Since the engaging means 270 and 360 according to the third exemplary embodiment can engage with each other at a plurality positions, it is possible to arbitrarily adjust the distance between the main body part 200 and the sub body part 300.

However, as the sub body part 300 is pulled out from the main body part 200, the part overlapping each other is shorten, and which causes a problem of the strength when the connection unit 100C alone fixedly supports the external device.

Figure 20:
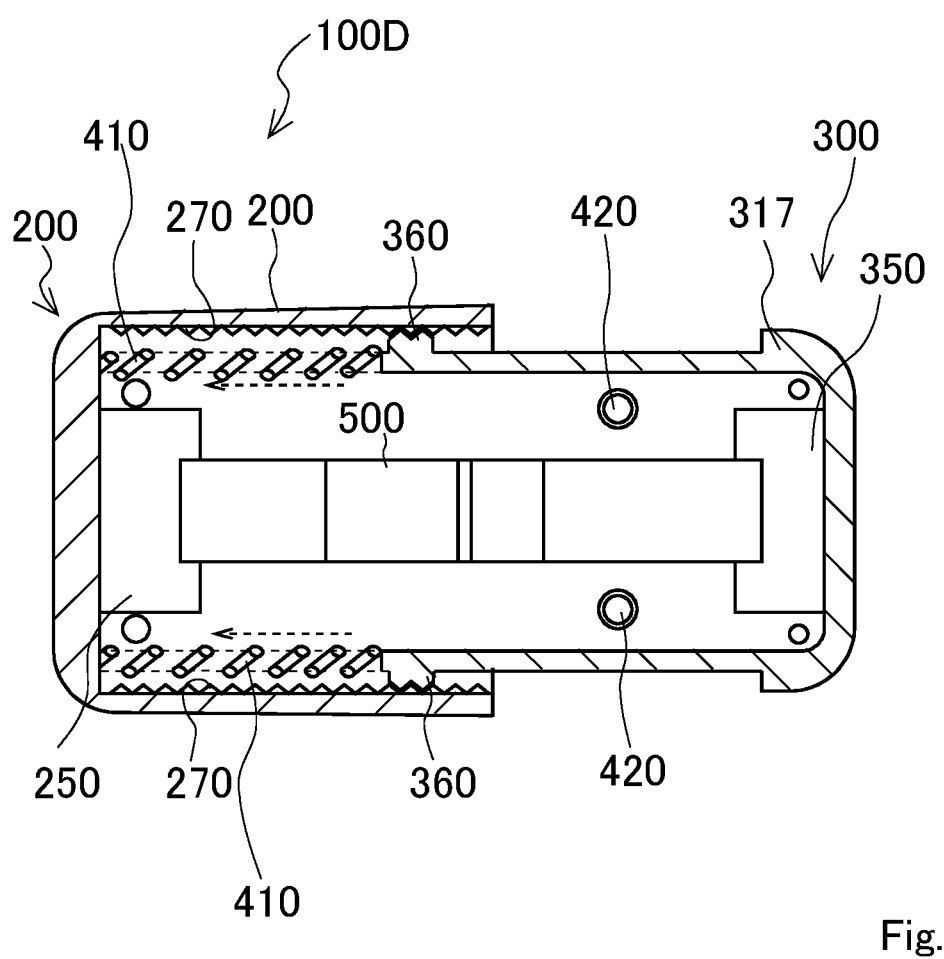
FIG. 20 is a diagram exemplifying a fourth exemplary embodiment.

For this reason, in the fourth exemplary embodiment, a spring 410 as an biasing means is provided between the main body part 200 and the sub body part 300 as shown in FIG. 20, and the biasing force applies to continuously draw the sub body part 300 toward the main body part 200. The elastic body may be rubber instead of the spring 410.

In addition, a retractable auxiliary supporting member 420 is provided on the bottom face 314 of the sub housing part 310.

In this example, the auxiliary supporting member 420 is a pin having a large-diameter flange head for preventing itself from slipping, and appears and retracts from a hole bored on the bottom face 314 of the sub housing part 310.

Figure 21:
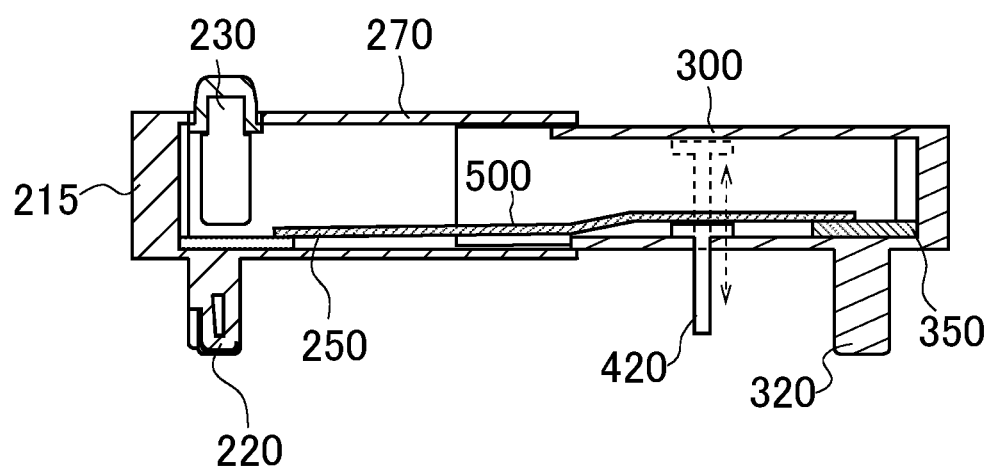
FIG. 21 is a diagram exemplifying the fourth exemplary embodiment.

As shown in FIG. 21, the auxiliary supporting member 420 protrudes from the bottom face 314 of the sub housing part 310 when the sub body part 300 is pulled out from the main housing part 210 by a predetermined amount. When the sub body part 300 is inserted deep inside the main housing part 210, the auxiliary supporting member 420 is pushed back to the inside of the sub housing part 310.

The reinforcing means is constituted by the spring 410 (elastic body) and the auxiliary supporting member 420.

Figure 22:
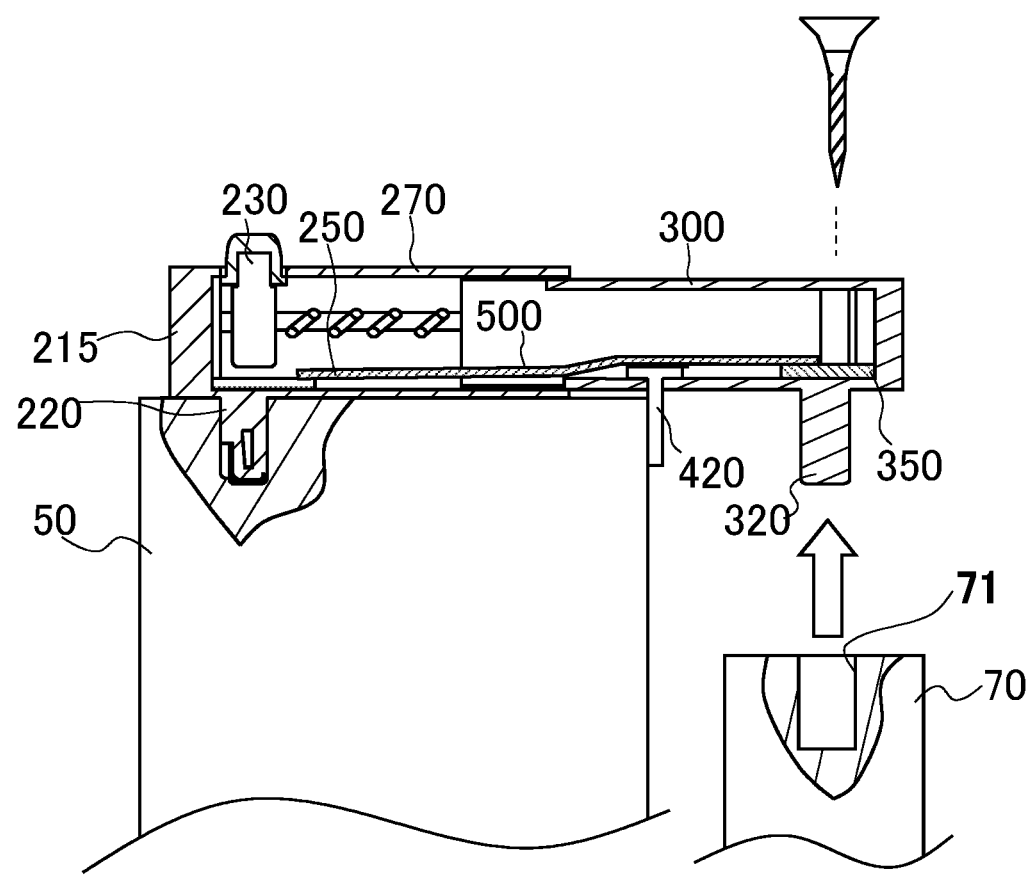
FIG. 22 is a diagram exemplifying usage in the fourth exemplary embodiment.

The effect of the reinforcing means in the fourth exemplary embodiment is described with reference to FIG. 22.

In order to connect the external device 70 to the long small-sized measurement device 50, the sub body part 300 is pulled out from the main housing part 210 to increase the distance between the main connector terminal 220 and the sub connector terminal 320. Then, as the spring 410 as the biasing means stretches, the strength with which the sub housing part 310 is drawn toward the main body part 200 (biasing force) is increased. In addition, the auxiliary supporting member 420 is pulled out from the bottom face 314 of the sub body part 300.

In this state, the main body part 200 is attached to the long small-sized measurement device 50. That is, while the main connector terminal 220 is inserted in the connection port of the long small-sized measurement device 50, the main body part 200 is fixedly connected to the long small-sized measurement device 50 by screwing. At this time, as exemplified in FIG. 22, the auxiliary supporting member 420 is in contact with the side face of the long small-sized measurement device 50, and serves as a stopper to fix the position of the sub body part 300. In addition, the long small-sized measurement device 50 is pinched by the auxiliary supporting member 420 of the sub body part 300 and the main connector terminal 220 of the main body part 200 (and screwing as the fixing means), and the position of the main body part 200 is thereby firmly fixed. That is, the connection unit 100D is stably attached to the long small-sized measurement device 50.

In this state, the connection port 71 of the external device 70 is attached to the sub connector terminal 320 of the sub body part 300, and the external device 70 and the sub body part 300 are screwed. Then, the external device 70 is attached to the long small-sized measurement device 50, and both are electrically connected.

With the configuration in the fourth exemplary embodiment, if the sub body part 300 is largely pulled out from the main housing part 210, the sub body part 300 is drawn toward the main body part 200 by the spring 410, and does not fall off the main body part 200 accidentally.

In addition, since the auxiliary supporting member 420 is in contact with the side face of the long small-sized measurement device 50 so as to press against the side face, the main body part 200 and the sub body part 300 are stably fixed to the long small-sized measurement device 50. Furthermore, the force of the spring 410 applies to the auxiliary supporting member 420, and does not act on the sub connector terminal 320. Thus, the force of the spring 410 does not apply to the connection port 71 of the external device 70, and the external device 70 is not deformed.

(Note that, although the force of the spring 410 applies to the connection port 51 of the long small-sized measurement device 50 and its periphery, there is a marginal space in the periphery of the connection port 51 of the long small-sized measurement device 50 relatively, and reinforcing such as thickening members can be possible.)

Note that, the present invention is not limited to the above embodiments, and can be appropriately changed without deviating from the scope.

The waterproof mechanism described in the second exemplary embodiment is applicable in the third and fourth exemplary embodiments.

In the above exemplary embodiments, a main body part has been attached to a main device, and a sub body part has been attached to an external device, but they may be inverted.

The invention claimed is:

1. A connection unit (100) configured to electrically connect a main-body connection port of a main device, the main-body connection port being used to input and output a signal, to an external-device connection port of an external device, the external-device connection port being used to input and output a signal, the connection unit (100) comprising:
a main body part (200) comprising a main connector terminal (220) to be electrically connected to the connection port of one device of the main device and the external device, and to be fixedly attached to the one device by a fixing means while the main connector terminal (220) is connected to the connection port of the one device;
a sub body part (300) comprising a sub connector terminal (320) to be electrically connected to the other device of the main device and the external device, and to be fixedly attached to the other device by a fixing means while the sub connector terminal (320) is connected to the connection port of the other device; and
an electric cable (500) electrically connecting the main connector terminal (220) to the sub connector terminal (320), wherein
the main body part (200) and the sub body part (300) are united by engaging by an engaging means, the engaging means being engageable and disengageable, and vary a relative position between the main body part (200) and the sub body part (300) by disengaging by the engaging means, and
the external device is electrically connected to the main device and is simultaneously attached to the main device by attaching the main body part (200) to the one device and attaching the sub body part (300) to the other device while the main body part (200) and the sub body part (300) are united.

2. The connection unit (100) according to claim 1, wherein
the engaging means comprises:
an engaging step portion (260 or 270) having a substantially-serrate section and provided to one of the main body part (200) and the sub body part (300); and
an engaging claw portion (360) provided to the other one of the main body part (200) and the sub body part (300), and engaging with the engaging step portion (260 or 270) so as to be engageable and disengageable.

3. The connection unit (100) according to claim 1, wherein the engaging means is engageable at a plurality of positions at which relative positions between the main body part (200) and the sub body part (300) are different.

4. The connection unit (100) according to claim 1, wherein
the main body part (200) comprises a bottomed-cylindrical main housing part (210) having an opening (212) on at least one surface, and
the sub body part (300) comprises a sub housing part (310) to be received inside the main housing part (210) from the opening (212) of the main housing part (210).

5. The connection unit (100) according to claim 4, further comprising an electronic substrate (250) disposed deep inside the main housing part (210), wherein
a waterproof wall (280) liquid-tightly partitioning a space between the opening (212) and the electronic substrate (250) is provided closer to the opening (212) than the electronic substrate (250).

6. The connection unit (100) according to claim 4, further comprising an biasing means (410) provided between the sub housing part (310) and the main housing part (210) and for generating an biasing force in a direction in which the sub housing part (310) moves toward the main housing part (210).

7. The connection unit (100) according to claim 6, wherein the biasing means (410) is an elastic body having one end fixed inside the main housing part (210) and the other end fixed to the sub housing part (310).

8. The connection unit (100) according to claim 6, wherein
the main connector terminal (220) is provided so as to protrude from the main housing part (210) in a direction orthogonal to the direction of the biasing force, and
the sub housing part (310) comprises an auxiliary supporting member (420) protruding in a direction parallel to the main connector terminal (220) and to be pressed against a sidewall of the main device when the sub housing part (310) is partially pulled out of the inside of the main housing part (210).

9. The connection unit (100) according to claim 4, further comprising a stretching covering member (390) having a cylindrical and bellows shape, wherein
the covering member (390) has one opening attached to the opening (212) of the main housing part (210) so as to surround the opening (212), and the other opening attached to an outer side face (316) of the sub housing part (310) to waterproof the inside of the main housing part (210).

* * * * *